US007242681B1

(12) United States Patent
Van Bokkelen et al.

(10) Patent No.: US 7,242,681 B1
(45) Date of Patent: Jul. 10, 2007

(54) SYSTEM AND METHOD FOR INTERCEPTING AND AUTHENTICATING PACKETS DURING ONE OR MORE COMMUNICATION SESSIONS AND AUTOMATICALLY RECOGNIZING CONTENT

(75) Inventors: James B. Van Bokkelen, South Hampton, NH (US); Michael A. Patton, Whitingham, VT (US)

(73) Assignee: Sandstorm Enterprises, Inc., Malden, MA (US)

( * ) Notice: Subject to any disclaimer, the term of this patent is extended or adjusted under 35 U.S.C. 154(b) by 150 days.

(21) Appl. No.: 10/150,499

(22) Filed: May 17, 2002

(51) Int. Cl.
*H04L 12/28* (2006.01)
(52) U.S. Cl. ...................... 370/389; 370/474
(58) Field of Classification Search ........... 370/252, 370/253, 395.1, 396, 229–235, 241, 241.1, 370/389, 474
See application file for complete search history.

(56) References Cited

U.S. PATENT DOCUMENTS 5,905,713 A * 5/1999 Anderson et al. .......... 370/241

6,678,270 B1 * 1/2004 Garfinkel .................... 370/392
6,950,447 B2 * 9/2005 Dieterich et al. ........... 370/516

\* cited by examiner

*Primary Examiner*—Wellington Chin
*Assistant Examiner*—Phuc Tran
(74) *Attorney, Agent, or Firm*—Rudoler & DeRosa LLC (57) ABSTRACT

A system is described for analyzing and automatically recognizing content of packet streams intercepted over a communication link. The system comprises an interface and a packet stream analyzer. The interface is configured to receive packets over the communication link and assemble the received packets into one or more packet streams. The packet stream analyzer is configured to receive respective packet streams from said interface and analyze each packet stream to generate selected types of information regarding the packet stream. The packet stream analyzer comprises an analyzer module graph comprising a plurality of analyzer modules interconnected in a graph. Respective ones of the analyzer modules are configured to perform at least one analysis operation in connection with at least a portion of a packet stream provided thereto to determine the likelihood that the packet stream is of one of a plurality of predetermined types, and generate at least one selected type of information in relation thereto.

22 Claims, 3 Drawing Sheets

SYSTEM AND METHOD FOR INTERCEPTING AND AUTHENTICATING PACKETS DURING ONE OR MORE COMMUNICATION SESSIONS AND AUTOMATICALLY RECOGNIZING CONTENT

INCORPORATION BY REFERENCE

U.S. patent application Ser. No. 09/267,449, filed Mar. 12, 1999, in the name of Simson L. Garfinkel and entitled "Packet Interception System Including Arrangement Facilitating Authentication Of Intercepted Packets" (hereinafter referred to as "the Garfinkel I patent application"), assigned to the assignee of the present application and incorporated by reference.

U.S. patent application Ser. No. 09/488,397, filed Jan. 20, 1999, in the name of Simson L. Garfinkel, entitled "Network Communications Surveillance System and Method" (hereinafter referred to as the Garfinkel II patent application), assigned to the assignee of this application and incorporated by reference.

FIELD OF THE INVENTION

The invention relates generally to the field of systems and methods for intercepting communications and more particularly to systems and methods for intercepting message packets associated with various communication sessions and analyzing the message packets based on their content, and providing authentication of the intercepted message packets and the analysis thereof.

BACKGROUND OF THE INVENTION

Wiretapping, including interception and recording of communications, can be quite useful in investigations by governmental agencies such as law enforcement, as well as private investigative agencies. Although originally developed to intercept analog telephonic communications, more recently agencies have discovered that wiretapping can also be useful in intercepting message packets transmitted by a computer or other packet source device, or received by another computer or other packet destination device, over, for example, a digital data network such as the Internet, World Wide Web, or the like.

Message packets may contain a variety of types of information in a variety of different formats. For example, message packets may contain information in textual form, information that defines an image, information that defines a Web page, or other types of information as will be appreciated by those skilled in the art. Textual information may be in plain text form or in a format that is used by a word processing program. Textual information may also be in a format such as that defined by, for example, the HyperText Markup Language ("HTML"), which is used to defined a Web page. Information that defines an image may be in any of a number of formats, including the well-known bitmap, GIF (Graphics Interchange Format),JPEG (Joint Photographic Experts Group), and MPEG (Motion Picture Experts Group) formats, the first three being used for still images and the last being used for moving images. Message packets may also contain audio files, which are intended to be played by the device that receives the respective message packets, in any of a number of formats, including the well-known MP3 (MPEG version 3), RM (Real Media) formats.

The information in a message packet may also be compressed using, for example, the well known ZIP compression methodology, or any of a number of other well-known compression methodologies. Alternatively or in addition, the information may be encoded using, for example, the well-known UUENCODE encoding methodology, which converts binary data to ASCII characters, which can, for example, be sent in Email, or using any of a number of other well-known encoding methodologies. In addition, the information may be encrypted using any of a number of well-known encrypting methodologies.

Given the wide variety of types of information that may be contained in message packets that have been intercepted during a wiretap session, it is often difficult to efficiently recognize the content of message packets and information streams contained in a series of message packets associated with a particular connection.

SUMMARY OF THE INVENTION

The invention provides a new and improved system and method for intercepting and authenticating packets during one or more communication session, automatically recognizing packet content and generating reports relating to the intercepted packets.

In brief summary, the invention provides a system is described for analyzing and automatically recognizing content of packet streams intercepted over a communication link. The system comprises an interface and a packet stream analyzer. The interface is configured to receive packets over the communication link and assemble the received packets into one or more packet streams. The packet stream analyzer is configured to receive respective packet streams from said interface and analyze each packet stream to generate selected types of information regarding the packet stream. The packet stream analyzer comprises an analyzer module graph comprising a plurality of analyzer modules interconnected in a graph. Respective ones of the analyzer modules are configured to perform at least one analysis operation in connection with at least a portion of a packet stream provided thereto to determine the likelihood that the packet stream is of one of a plurality of predetermined types, and generate at least one selected type of information in relation thereto.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
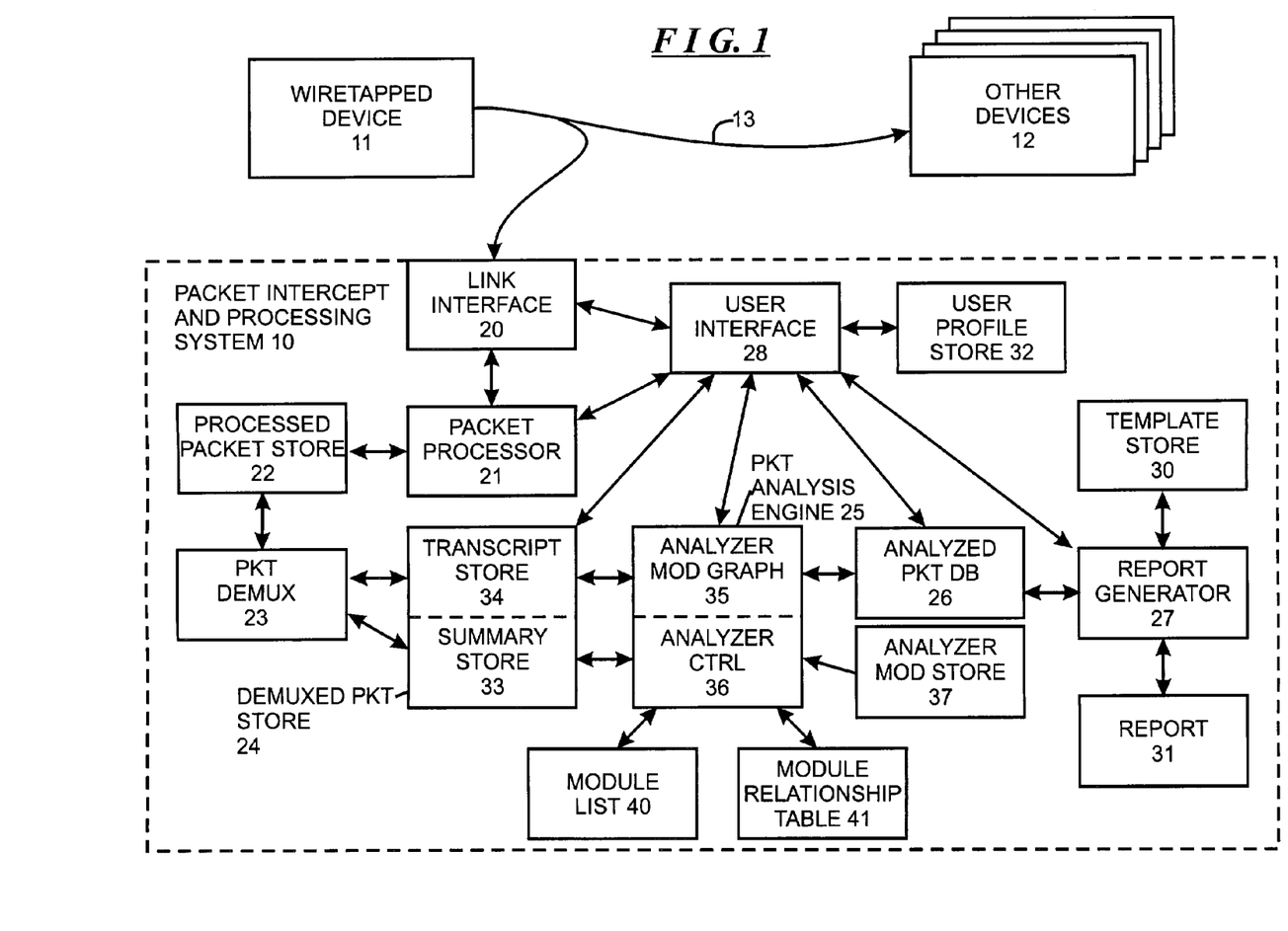
FIG. 1 is a functional block diagram of a packet interception and processing system including an arrangement for intercepting and authenticating packets during one or more communication session, automatically recognizing packet content and generating reports relating to the intercepted packets.

FIG. 1 is a functional block diagram of a packet interception and processing system 10 that intercepts message packets, process the intercepted message packets to generate information relating thereto, and that facilitates the authentication of the intercepted message packets and the information generated therefor, constructed in accordance with the invention. With reference to FIG. 1, the packet interception and processing system 10 is used to intercept message packets transferred between one device, identified by reference numeral 11, and one or more other devices, generally identified by reference numeral 12, over a communications medium 13. In FIG. 1, device 11 will be identified as a "wiretapped" device, and, in that regard, the packet interception and processing system 10 will intercept message packets that are transmitted and received by the device 11 over the communication link 13. The wiretapped device 11 may comprise any mechanism for generating and transmitting packets over a communications medium, and for receiving packets over the communications medium and utilizing them, including, for example, a personal computer, computer workstation or the like. Similarly, each of the other device(s) 12 may comprise any mechanism for receiving packets and utilizing and/or storing packets, and for generating and transmitting them, including, for example, a personal computer, computer workstation, a mass information storage subsystem, hardcopy output device, or the like. The communications link 13 may comprise any of a number of types of media for transferring packets between the wiretapped device 11, including, for example, a public digital data network such as the Internet or World Wide Web, a private network, the public switched telephone network (PSTN), a wireless link, or any other mechanism by which digital data can be transferred between the devices 11 and 12.

Wiretapped device 11 and device(s) 12 may operate according to any of a number of well-known information transfer paradigms. For example, devices 11 and 12 may operate according to a "client/server" paradigm, in which some devices operate as a "client" and other devices operate as servers. According to the client/server paradigm, one device, operating as a client device, retrieves information from another device, operating as a server device. The client device initiates a download, or transfer, of information to it (that is, the client device) from a server device by transferring one or more message packets to the server device, the message packets identifying the information to be retrieved. The server device, in turn, will transfer the identified information to the client device in one or more message packets. A client device can download information from a number of server devices and, contrariwise, a single server can download information to a number of client devices. It will be appreciated that a single device can operate as a client device, as a server device or as both a client device (with one or more server devices) and a server device (with one or more client devices). If the wiretapped device 11 operates as a client device, the packet information and processing system 10 can intercept and process message packets that the device 11 transmits to other devices requesting downloading of information as well as the message packets that the device 11 receives from the other devices providing the requested information. If the wiretapped device 11 operates as a server device, the packet information and processing system 10 can intercept and process message packets that the device 11 receives requesting downloading of information as well as message packets that the device 11 transmits providing the requested information.

It will be appreciated that the wiretapped device 11 and other device(s) 12 can operate according to other paradigms, including, for example, the well-known "peer-to-peer" paradigm, or according to any combination of paradigms.

The packet interception and processing system 10 operates as a wiretap mechanism to eavesdrop on and intercept the message packets transmitted by the wiretapped device 11 over communications medium 13. As is conventional, each message packet may be associated with a communication session. A communication session, in turn, may be associated with one or more message packets. As will be used herein, a "connection" corresponds to a set of message packets that are used in a transfer using the well-known TCP/IP (Transmission Control Protocol/Internet Protocol) protocol. A "packet stream," in turn, corresponds to one or more packets that comprise a connection, or one or more packets transferred using the well-known UDP (user datagram protocol) protocol.

A message packet typically comprises a header portion and a "payload" portion. The "payload" comprises the information that is to be transferred in the message packet. The payload of a message packet, or the payloads of a set of message packets, comprise a steam of bytes that, in turn, comprise or define one or more objects. The header of a message packet contains information that is useful in transferring the message packet between the source device and the destination device, which information may include, for example, network addresses identifying the destination and source devices, a protocol identifier, and other information as will be apparent to those skilled in the art. In addition, the header may contain information that is useful in identifying a set of message packets that are associated with a connection, packet stream and/or session, as well as information identifying the particular connection, packet stream and/or session, and information useful in assembling each object if, for example, the information comprising the respective object is divided up among a plurality of message packets. The header may also contain information that is useful in verifying that all of the message packets associated with a particular packet stream have been received by the destination device. Typically, an object is transferred from a source and destination using a protocol "stack," which, at both the source and destination devices, comprises a set of programs arranged in a series of levels that may facilitate associating message packets with a respective connection, packet stream or session, verification that all message packets associated therewith have been properly received, and assembly of the respective object as necessary. Each level in the hierarchy may, in turn, be associated with its own set of protocol information, all of which can be provided in the header portion(s) of respective message packets. Accordingly, a message packet may be associated with a set of nested protocols each of which, in turn, is associated with one of the various levels in the protocol stack and each of which may be associated with protocol information provided in the respective message packet.

Typically, an object comprises a set of bytes that denote or define a self-contained data structure, such as text, an image, or audio associated with a Web page or other type of document. Textual information may, for example, be in ASCII text form, in a form typically generated by a word processor such as Microsoft Word® or Corel® WordPerfect®, in a form encoded using any of a number of encoding methodologies, or in any other form as will be apparent to those skilled in the art. One illustrative encoding methodology is the well-known HTML (HyperText Mark-up Language) that is typically used to define the structure of, and provide textual information for, Web pages. As is well known, an HTML object may also include links to other objects, such as image or audio information, that may, in the case of images, be displayed as part of, or, in the case of audio information, be played along with, the respective Web page. Image information defines a still or moving image, and may be encoded using any of a number of encoding methodologies, including, for example, the well-known JPEG (Joint Photography Experts Group), GIF (Graphics Interchange Format), and MPEG (Motion Pictures Experts Group) encoding methodologies. Audio information defines sounds that are to be played, and may be encoded using any of a number of encoding methodologies, including, for example, the well known WAV (wave), MP3 (MPEG version 3), RM (Real Media) encoding methodologies.

An object may be contained in the payload(s) of one or more message packets, and may be encoded, compressed and/or encrypted using any of a number of well-known generally-applicable encoding, compression and/or encryption methodologies. For example, the payload(s) may be encoded using the well-known UUENCODE encoding methodology, compressed using the well-known ZIP compression methodology and/or encrypted using any of a number of well-known the well-known encryption methodologies.

As noted above, an object may be encoded, compressed and/or encrypted using a generally-applicable encoding, compression, and/or encryption methodology. A "bytestream" corresponds to the object in decrypted, de-compressed and/or decoded form.

A communication session, in turn, more specifically comprises one or more related packet streams, bytestreams, objects, and/or collections of objects. For example, a communication session associated with a Web page will generally comprise the set of packet streams, bytestreams and/or collection of objects that are associated with the Web page, which may include a text object in HTML format, one or more image objects encoded using associated image encoding methodologies, one or more audio objects encoded using associated audio encoding methodologies, and, perhaps, other types of objects, which may be displayed (in the case of the text and image object(s) or played (in the case of the audio object(s)) by the device after they have been received. Similarly, a communication session associated with an Email message will comprise the set of packet streams, bytestreams and/or collection of objects that are associated with the Email message, which may also include a text object in an Email format, one or more image objects and one or more audio objects. Communication sessions associated with other types of entities will be apparent to those skilled in the art.

As noted above, the packet interception and processing system 10 operates as a wiretap mechanism to eavesdrop on and intercept the message packets transmitted by the wiretapped device 11 over communications medium 13. In addition, the packet interception and processing system 10 analyzes the packet streams, bytestreams, and objects comprising respective communication sessions and provides mechanisms whereby the packet streams, bytestreams, objects and the analyses can be recognized and authenticated. As will be described in detail below, recognition and analysis is performed by a plurality of protocol- and information-format-specific parsing analyzer modules that are arranged in a graph. The graph includes a root module that is associated with unprocessed packet streams. The root module has, as children, modules that can parse the packet streams and recognize and/or analyze low-level types of information that are extracted from communication sessions, including, for example, information associated with particular protocols that may be used to transfer message packets between the wiretapped device 11 and the other devices(s) 12. These child modules, in turn, have, as deeper-level children, other modules that can recognize and/or analyze higher-level types of information, such as higher level protocol information, object content or content comprising portions of objects, and the like. Similarly, these deeper-level child modules can have also have yet deeper-level child modules, and so on down the graph. The graph can also have cycles, as will be described below. Traversal of the graph is driven by heuristics that are specific to the respect modules and the particular characteristics of the type(s) of packet streams, bytestreams, and objects that are recognized thereby, by relationships established by modules between separate packet streams, bytestreams or objects, and by stream assembly and transformation operations that are performed by the respective modules.

The packet interception and processing system 10 can perform authentication by cryptographically signing the message packets as they are intercepted, along with a time stamp associated with the time at which the packet interception and processing system 10 receive the message packet, and, perhaps, other identifying information. In addition, the packet interception and processing system 10 separately cryptographically signs the results of processing, the results including the results provided by the various module(s) comprising the graph during graph traversal as well as information defining the configuration of the graph, that is, the manner in which the various modules comprising the graph are interconnected. Since the information defining the configuration of the graph is cryptographically signed, if the graph is re-established at some time after the end of a session to, for example, confirm results of processing during the session, the fact that the configuration of the re-established graph corresponds to the configuration of the graph during the session can be established by generating a cryptographic signature for the re-established graph and comparing it to the cryptographic signature that was generated for the graph for the configuration that was used during the session. If the cryptographic signatures match, the re-established graph will have the same organization as the graph during the session. Similarly, since each message packet, along with the time stamp and other identifying information that may be provided, is individually cryptographically signed, one can, at any time, verify that the message packet, time stamp and other identifying information corresponds to the message packet, time stamp and other identifying information for which the cryptographic signature was originally generated by generating a new cryptographic signature and comparing the new cryptographic signature to the cryptographic signature that was generated when the message packet was originally received. Thus, one can verify the results of processing during a particular processing session by initially re-establishing the graph, and using the cryptographic signature to verify that the re-established graph corresponds to the originally-constituted graph. After the graph has been re-established and verified, the message packets can be applied to the graph, and the results generating by the graph compared to the previously-generated results. That the message packets correspond to the message packets as originally received can also be verified using their individual cryptographic signatures.

Details of operations performed by the packet interception and processing system 10 will be described in detail in connection with FIGS. 1 through 3. The mechanism by which the packet interception and processing system 10 intercepts copies of the message packets from the communications medium is well-known and will not be described herein. After receiving a message packet, the packet interception and processing system 10 can, as described in the aforementioned Garfinkel I patent application, append the time stamp that identifies the time at which the packet was intercepted, and in addition provide a tag that facilitates authentication of both the information in the packet and the sequence with which packets are received to a high degree of reliability. The packet interception and processing system 10 includes a link interface 20, a packet processor 21, a processed packet store 22, a packet demultiplexer 23, a demultiplexed packet store 24, an analysis engine 25, an analyzed packet database 26, and a report generator 27 all of which operator under control of a user interface/control module 28. The link interface 20 receives copies of the packets transferred between the wiretapped device 11 and device 12 from the communications medium 13 and provides them to the packet processor 21 for processing. The link interface 20 may include any suitable network interface through which the packet interception and processing system 10 can receive message packets. In addition, the link interface 20 may also provide connections to other types of equipment, including, for example, personal computers, computer workstations or the like over which the packet interception and processing system 10 can provide information as described below.

The packet processor 21 appends the time stamp and the tag to the message packet to generate a processed packet, and stores the processed packet in the processed packet store 22. In one embodiment, the structure of processed packets and their organization as stored in the processed packet store 22 are as described in the aforementioned Garfinkel I application, as are operations performed by the packet processor 21 in connection with generating the tag appended to the processed packets. The time stamp provided by the packet processor 21 identifies the time at which the packet processor 21 processed the packet, which will normally be a function of the time the packet was received by the packet interception and processing system 10. The tag appended to the packet in each processed packet facilitates authentication of the contents of the packet, as well as the time stamp. In addition, the manner in which the tags for successive processed packets are generated further serves to authenticate the packet sequence.

Packets intercepted and stored in the processed packet store may relate to messages that are associated with several sessions that may wiretapped device 11 may be engaged in with one or more of the other devices 12. After a processed packet has been stored in the processed packet store 22, the packet demultiplexer 23 can retrieve the processed packet from the processed packet store 22 and store the processed packets in the demultiplexed packet store, the processed packet being stored in such a manner as to reconstruct the various packet stream(s) that may be associated with the various session(s) in which the wiretapped device 11 may be engaged. The reconstructed packet streams as reconstructed by the packet demultiplexer 23 can facilitate reconstruction of the respective object. In addition, the packet demultiplexer 23 also generates summary information for the respective streams, which it also stores in the demultiplexed packet store 24. The demultiplexed packet store 24 comprises two storage sections, including a summary store 33, in which the summary information is stored, and a transcript store 34 in which the reconstructed packet streams are stored. The summary information generated by the packet demultiplexer 23 may include, for example, a pointer to the beginning of the reconstructed packet stream in the transcript store, time stamps for the first and last message packets comprising the reconstructed packet stream, length information such as the number of message packets and/or number of bytes comprising the reconstructed packet stream, the identification of the source and destination for the message packet(s) comprising the packet stream, and other information as will be appreciated by those skilled in the art.

The packet analysis engine 25 serves to analyze the processed packet streams that are stored in the demultiplexed packet store 24. The packet analysis engine 25 includes an analyzer module graph 35 that operates under control of an analyzer control module 36. The analyzer module graph 35 includes the aforementioned analyzer graph, comprising the aforementioned protocol- and information-format-specific parsing analyzer modules. As noted above, the analyzer modules cooperate to recognize and analyze the protocols and contents of the respective packet streams that are stored in the transcript store 34. The analyzer modules comprising the analyzer module graph 35 operate under control of the analyzer control module 36, which, in turn, makes use of the summary information that is stored in the summary store 33 in controlling the analyzer modules. The analyzer control module 36 can enable data from respective processed packet streams to be retrieved from the transcript store 34 and be provided to the analyzer module graph 35 for processing.

The analyzer modules comprising graph 35 operate to analyze the respective processed packet streams from the transcript store 34, to decode, decompress and/or decrypt them as necessary, parse the content and store the parsed content and other information in the analyzed packet database 26. An illustrative analyzer module graph 35 will be described in detail below in connection with FIG. 2. Generally, each analyzer module in the graph 35 is configured to parse message packets provided thereto and, using information generated during the parse, and perhaps, other information that it may receive, perform one or more of a number of types of operations. Analyzer modules may perform a number of types of operations, including, for example, determining the likelihood that a packets is of a particular protocol or content type, decoding, decrypting and/or recognizing, packet content and/or packet transfer protocol information, storing information such as the protocol type information and/or the decoded, decrypted or recognized information in the analyzed packet database 26, and the like. It will be appreciated that the analyzer modules will also store authentication information in the analyzed packet database 26 along with the other information, which can facilitate later authentication of that other information as described above.

Generally, packet information from the transcript store 34 will initially be provided to a ROOT module, which distributes the packet information to one or more analyzer modules that comprise its child modules. "Packet information" will be used to generally refer to an individual message packet, message packets comprising a packet stream, information from the payload portion(s) of one or more message packets in a packet stream which may comprise, for example, one or more objects, or other types of information that may be transferred in the payload portion of one or more message packet, or any combination thereof. The information in or from the payload portion(s) of respective message packets may be encoded, compressed, and/or encrypted form, in UUENCODEd, uncompressed and/or unencrypted form, or any combination thereof. The ROOT module may, in addition to the packet information, receive other information, which will be referred to as packet meta information, that generally describes the packet information. The packet meta information may be generated by, for example, the packet processor 21 or the packet demultiplexer 23 as they are processing the respective packet(s) prior to storage in the respective processed packet store 22 or transcript store 34. If the ROOT module does receive packet meta information, the ROOT module can use the packet meta information in determining which of its child modules should receive the packet information. In addition, if the ROOT module does receive packet meta information, it can also provide that packet meta information to the child module(s) to which it provides the packet information. The ROOT module may also generate packet meta information for provision to the analyzer module(s) to which it provides the packet information.

When an analyzer module in the graph 35 below the root module receives packet information from a parent analyzer module in the graph, it will process the packet information to try to determine whether the packet's protocol or content type corresponds to the protocol or content type, or one of the types, that the respective analyzer module is designed to identify. If the analyzer module also receives packet meta information, it can make use of the packet meta information in its operations. In identifying the protocol or content type, the respective analyzer module may, for example, make use of one or more characteristics of the respective protocol or content type to determine whether packet information conforms to the respective protocol or content type. If the analyzer module is able to identify the protocol or content type, it may provide the packet information to one or more child modules for further processing. If, for example, an analyzer module is designed to identify a type of protocol associated with one level in the protocol stack, the child or children to which the analyzer module provides the packet information may be designed to identify a type of protocol that is associated with another, generally higher, level in the protocol stack. On the other hand, if an analyzer module is designed to identify a type of protocol that is in the highest level in the protocol stack, the child or children to which the analyzer module provides the packet information will generally be associated with processing and identifying a type of content. At various levels, packet information may be directed to analyzer modules that can attempt to decode, decompress and/or decrypt the packet information as necessary to provide unencoded, uncompressed and unencrypted packet information. Ones of the analyzer modules may also generate packet meta information that they can, along with packet information, provide to their child modules to assist them in their operations.

The analyzer modules also generally store information regarding the results of their processing in the analyzed packet database 26. For example, if an analyzer module associated with a protocol type determines that the packet information is associated with that protocol type, the analyzer module can store information so indicating in the analyzed packet database 26. In addition, to the information identifying the particular protocol type, the analyzer module may also store other information from, for example, the header(s) associated with that protocol type. Similarly, if an analyzer module associated with a particular content type determines that the packet information that it receives is associated with associated with that content type, the analyzer module can store information so indicating in the analyzed packet database 26.

Similarly, if an analyzer module that is associated with a particular decoding, decompression and/or decryption methodology attempts to decode, decompress and/or decrypt packet information, the analyzer module can store information so indicating in the analyzed packet database 26, which information may, for example, indicate whether it successfully decoded, decompressed and/or decrypted the packet information. In addition, if the analyzer module successfully decodes, decompresses and/or decrypts the packet information, it can store the decoded, decompressed and/or decrypted packet information in the analyzed packet database 26, and, in addition, provide the decoded, decompressed and/or decrypted packet information to one or more child modules for further processing.

If an analyzer module that receives packet information determines that the packet information is not associated with the particular protocol or content type(s) with which the analyzer module is associated, the analyzer module can also store information so indicating in the analyzed packet database 26. Similarly, if an analyzer module that is designed to decode, decompress and/or decrypt packet information determines that it is unable to do so in connection with packet information provided thereto, the analyzer module can also store information so indicating in the analyzed packet database 26. It will be appreciated that the analyzer module may be unable to decode, decompress and/or decrypt packet information that is provided thereto for any of a number of reasons, including, for example, the fact that, even though the packet information may contain an indication that it is encoded, compressed and/or encrypted using a particular encoding, compression or encryption methodology, it (that is, the packet information) may, in fact not be encoded, compressed or encrypted using the particular encoding, compression or encryption methodology.

The information stored in the analyzed packet database can be any of a number of types of information. In one embodiment, the analyzed packet database 26 comprises a number of SQL ("structured query language") tables in which information such as, for example, session connection information, parsed filed information, parse statistics, object information and the like can be stored. After packet information has been stored in the analyzed packet database 26, the information can be used by the report generator 27 to generate various types of reports 31. In one embodiment, a number of types of reports are pre-defined, templates for which are provided in a template store 30.

The user interface 26 provides an arrangement whereby an operator can control the operations of the packet interception and processing system 10. The user interface 26 can include, for example, a video display device (not separately shown) for displaying information to the operator, a keyboard and pointing device (also not separately shown) that the operator can use to input into to the system 10, and so forth. The operator, through the user interface 28, can enable the network interface 20 to begin intercepting packets from the communication link 13 for processing by the packet processor 21 and storage in the processed packet store 22. In addition, the operator, through the user interface 28, can enable the packet demultiplexer 23 to retrieve the processed packets from the processed packet store 22, demultiplex them to generate the message streams for storage in the transcript store 34, and generate the summary information for storage in the summary store 33. Furthermore, the operator, through the user interface 28, can control the analyzer control 36 to, in turn, enable demultiplexed packet information to be retrieved from the transcript store and provided to the analyzer module graph 35 for processing. In addition, the operator, through the user interface 28, can enable the report generator 27 to generate one or more reports 31 using one or more of the templates from the template store 30, using database queries input by the operator or using other information provided to the report generator 27 as will be appreciated by those skilled in the art. The operator can enable these operations to be performed directly though the user interface, by selection of user profiles that may be stored in a user profile store that identify particular reports that are to be generated for the respective profile, or in other manners as will be apparent to those skilled in the art.

As noted above, the analyzer modules are connected in a graph 35, an illustrative one of which will be described in connection with FIG. 2. With reference to FIG. 2, the illustrative graph 35 includes a plurality of analyzer modules organized in a graph. As noted above, each analyzer module is configured to be able to perform one or more operations, which may include, for example, determining the likelihood that a packet is of a particular protocol or content type, decoding, decompressing and/or decrypting packet information, recognizing packet information, storing the packet information and/or recognized packet information in the analyzed packet database 26, and the like. In addition, some analyzer modules essentially operate to distribute packet information and perhaps packet meta information to the analyzer modules, as will be described below.

Generally, when an analyzer module attempts to determine whether message packets comprising a packet stream are associated with a particular type of transfer protocol, it will attempt to determine whether the message packet(s) contain features that are typical of that type of transfer protocol. Similarly, when an analyzer module attempts to determine whether message packets comprising a packet stream contain information of a particular type of content information, it will attempt to determine whether the packet information contains features that are typical of the respective content information type. Similarly, when an analyzer module attempts to determine whether message packets comprising a packet stream are associated with packet transfer protocol information of a particular type, it attempts to determine whether the message packet contains features that conform to the definition of the particular transfer protocol. If an analyzer module determines that a particular element of packet information or packet transfer protocol information has features of a particular type of content information or packet transfer protocol information, it (that is, the analyzer module) can determine that the particular element is likely to be of the particular type.

If two or more analyzer modules determine that there is non-zero likelihood that particular element of packet information or packet transfer protocol information is of a respective type as recognized by the respective analyzer module, and if the types are mutually exclusive, the analyzer control module 36 can select one of the types as the correct one. Thus, for example, if an analyzer module is provided to recognize textual information in a selected format and another analyzer module is provided to recognize image information in a selected format, and if both of them determine that there is a non-zero likelihood that a particular element of packet information is of the respective textual or image information type, the analyzer control module 36 will select the format type based on likelihood information provided by the analyzer modules. The analyzer modules essentially generate likelihood information indicating the likelihood that the particular element of packet information is in the respective format, based on the presence or absence of features in the respective format in the element of packet information. The analyzer control module 36 will use the likelihood information generated by the respective analyzer modules to select the format type for the element of packet information. Similar operations are performed in connection with analyzer modules that are provided to recognize other types of information, including packet transfer protocol information.

The illustrative analyzer module graph 35 depicted in FIG. 2 can contain cycles, as will be described below. The graph begins with the aforementioned ROOT module. The ROOT module, under control of the analyzer control module 36, receives packet information from the transcript store 34, perhaps along with packet meta information that may be stored along with the packet information in the transcript store 34. As noted above, some types of message packet transfer protocols and some types of content provide information as to the particular message packet transfer protocol that is used and/or type of content that is transferred in the respective message packet stream, which information is stored as the packet meta information in the transcript store 34. The ROOT module, after it receives the packet information and the packet meta information, distributes the information to one or more other analysis modules in the graph 35. The ROOT module distributes message packet information stream to modules that determine the lower level message transfer protocol that was used to transfer the message packets comprising the message packet stream. In the illustrative graph 35 depicted in FIG. 2, one of the analysis modules to which the ROOT module provides the message packet information stream is an IP module which, for each processed packet in the respective stream provided thereto by the ROOT module, performs selected checking operations in connection with the respective processed packet to determine whether the structure of the processed packet indicates that it is likely to be a packet that conforms to the well-known IP protocol.

The ROOT module may also provide processed packets to other modules (not shown), which can determine whether the structure of the processed packet conforms to those defined by respective non-IP protocols. The ROOT module may direct the packet information to one child module if, for example, packet meta information that it receives provides an indication that the packet conforms to the protocol with which its respective child module is associated. If that child module determines that the packet information does correspond to the respective protocol, as will be described in connection with the IP module, operations con proceed down the graph as will also be described below. On the other hand, if that child module determines that the packet information does not correspond to the respective protocol indicated by the packet meta information, it can so notify the ROOT module, which, in turn, can distribute the packet information to its other child modules, which, in turn, can attempt to determine whether the packet information conforms to their respective protocols. If one of the ROOT module's child modules determines that the packet information is likely to conform to its respective protocol, that child module can so notify the ROOT module and operations can proceed down the graph as described below. If a plurality of the ROOT module's child modules determines that the packet information is likely to conform to their respective protocols, the ROOT module can select one of the protocols based on likelihood information provided by the child modules, after which operations can proceed down the graph. On the other hand, if all of the child modules determine that the packet information is not likely to conform to their respective protocols, the ROOT module can store an indication thereof in the analyzed packet database 26, and operations in connection with the packet information can terminate.

An IP message packet includes an IP header, for which a checksum is generated by the source device and included in a particular position, referred to as a "checksum" field, in the header portion of the message packet. In performing the protocol checking operations in connection with a message packet in the packet information provided by the ROOT module, the illustrative IP module can perform a checksum verification operation in connection with the portion of the message packet that, if it is an IP packet, would comprise the IP header to generate a checksum value. After the IP module generates the checksum, it will compare the generated checksum to the binary-encoded value represented by the bits of the processed message packet that are in the positions of the message packet in which the checksum value would be located if the message packet is an IP packet. If the IP module determines that the checksum value that it generates corresponds to the binary-encoded value represented by those bits of the processed message packet, it can determine that it is likely that the processed message packet is an IP packet. On the other hand, if the IP module determines that the checksum value that it generates does not correspond to the binary-encoded value represented by those bits of the processed message packet, it can determine either that it is unlikely that the message packet is an IP packet, or, if the message packet is an IP packet, that an error occurred in connection therewith. If the packet stream comprises a plurality of message packets, the IP module can perform these operations in connection with each message packet. If the IP module determines, for example, that the checksum values that it generates or some message packets correspond to the binary-encoded values represented by the bits of some of the respective message packets of the message stream, but not for others, the IP module may determine either (i) that the message packets comprising the message stream are IP packets, but there is an error in connection with the message packets for which the checksum values generated by the IP module do not correspond to the binary-encoded values represented by the bits of those message packets, or (ii) that the message packets comprising the message stream are not IP packets, based, for example, on the number of message packets for which the checksum values generated by the IP module correspond to the binary-encoded values represented by the bits of the respective message packets. The IP module may also perform other operations to determine whether the message packets comprising the message packet stream provided thereto by the ROOT module are IP packets.

If the IP module determines that the stream of message packets provided thereto by the ROOT module comprises IP message packets, it can enable information so indicating to be stored in the analyzed packet database 26. Other modules (not shown) to which the ROOT module provides the message packet stream may perform similar protocol checking operations in connection with their respective message transfer protocols.

If the IP module determines that the packet information provided thereto by the ROOT module comprises IP message packets, it can strip off the portions of the respective message packets that comprise the IP headers and provide the remaining portions of the packet information to one or more of its child modules, possibly along with packet meta information. In the illustrative graph 35 depicted in FIG. 2, the child modules of the IP module include a UDP module and a TCP module, each of which performs selected operations in connection with the packet stream provided thereto by the IP module to determine whether the packets' structures correspond to that defined by a UDP protocol (that is, a "UDP packet stream") or to that defined by a TCP protocol (a "TCP packet stream").

Similar to the ROOT module as described above, the IP module may initially direct the packet information to one child module or the other if, for example, packet meta information that it receives from the ROOT module provides an indication as to whether the packet information comprises a UDP packet stream or a TCP packet stream. The IP module may direct the packet information to the UDP module if, for example, packet meta information that it receives provides an indication that the packet information is a packet stream defined by the UDP protocol, which will be referred to herein as a UDP packet stream. Similarly, the IP module may direct the packet information to the TCP module if packet meta information provides an indication that the packet information is a packet stream defined by the TCP protocol, which will be referred to as a TCP packet stream. If the UDP module determines that the packet information is likely to be a UDP packet stream, and (if the IP module has also directed the packet information to the TCP module) if the TCP module determines that the packet information is not likely to be a TCP packet stream, the analyzer module graph 35 will determine that the packet information is a UDP packet stream. On the other hand, if the TCP module determines that the packet information is likely to be a TCP packet stream, and (if the IP module has also directed the packet information to the UDP module) if the UDP module determines that the packet information is not likely be a UDP packet stream, the analyzer module graph 35 will determine that the packet information is a TCP packet stream.

The analyzer module graph 35 can determine that packet information is a UDP packet stream or a TCP packet stream in any of a number of ways. For example, if, based on packet meta data that IP module receives, the IP module directs the packet information to, for example, the UDP module and not the TCP module, and if the UDP module determines that the packet information is a UDP packet stream beyond a predetermined likelihood, the UDP module can so notify the IP module. The UDP module, after receiving such a notification, can store an indication that the packet information is a UDP packet stream in the analyzed packet database 26. If, on the other hand, the UDP determines that the packet information is a UDP packet stream, but with a likelihood less that the predetermined likelihood, the IP module can also direct the packet information to the TCP module, which will determine the likelihood that the packet information is a TCP packet stream and provide an indication of the likelihood to the IP module. Based on the likelihood information that the IP module receives from the UDP and TCP packet streams, the IP module can determine that the packet information is to be considered one of the UDP packet stream the or TCP packet stream, and so notify the respective module. As another possibility, if the IP module does not receive or otherwise makes use of packet meta information in determining the child module to which it should initially direct the packet information, it can direct the packet information to both the UDP module and the TCP module, and determine that the packet information is to be considered one of the UDP packet stream or the TCP packet stream based on likelihood information that it receives from the respective child modules. In any case, after the IP module determines that the packet information is to be considered one of the UDP or TCP packet stream, it can so notify the respective UDP or TCP module, which, in turn, can store an indication thereof in the analyzed packet database 26, and transfer the packet information to one or more of its children for further analysis.

As a further possibility, if the IP module receives likelihood information from both of its child modules that is below a selected likelihood level, the IP module can determine that the packet information is neither a UDP packet stream nor a TCP packet stream. In that case, the IP module can store an indication thereof in the analyzed packet database 26, after which the analyzer module graph 35 may terminate processing operations by in connection with the packet information.

As with the IP module, the UDP and TCP modules can determine the likelihood as to whether the packet stream is a UDP packet stream or a TCP packet stream by performing, inter alia, checksum verification operations in connection with portions of the packet stream provided thereto by the IP module. Generally, if the packet stream is an IP packet stream, each message packet in the stream will have, in addition to the IP header, either a UDP header or a TCP header, or perhaps a header defined by another protocol, that is also protected by a checksum value that is provided in a predetermined portion of the message packet.

Accordingly, in the checksum verification operation, the UDP module will, for each message packet in the stream, perform operations similar to those described above in connection with the IP module to determine the likelihood that the respective message packet is a UDP message packet. If the UDP module determines that the checksum value that it generates corresponds to the binary-encoded value in the appropriate portion of the message packet, it may determine that the message packet is likely to be a UDP message packet. On the other hand, if the UDP module determines that the checksum value that it generates does not correspond to the binary-encoded value in that portion of the message packet, it may determine that the message packet is likely not a UDP packet, or, if it is a UDP packet, that the UDP packet was not correctly received. As with the IP module, the UDP module can make a determination as to whether the stream of message packets is likely to be a stream of UDP message packets based on the number or percentage of message packets in the stream for which the checksum value generated by the UDP module corresponds to the respective binary-encoded values in the appropriate portions of the respective message packets. The UDP module may also perform other protocol-check operations to determine the likelihood that the message packets are UDP packets.

The TCP module can perform similar checksum verification and, perhaps, other operations to determine the likelihood that the packet is a TCP packet. In addition, since TCP packets can arrive at a destination out of order, the TCP module can re-organize a series of TCP packets in a stream of message packets provided thereto by the IP module in the proper order.

As noted above, if it is determined that a packet stream comprises UDP packet stream, the UDP module can store information therefor in the analyzed packet database 26. In addition, the UDP module can strip the UDP header(s) off the packet information and provide the remaining portion(s) of the packet information to one or more of its child modules of processing. Similarly, if it is determined that packet information comprises TCP packet stream, the TCP module can store information therefor in the analyzed packet database 26. In addition, the TCP module can strip the TCP header off the message packets and provide the remaining portion(s) of the packet information to one or more of its child modules for processing. As with the ROOT and IP modules described above, the respective UDP or TCP module may provide the packet information to one of its children based on packet meta information, or to two or more of their respective children. In the illustrative analyzer module graph 35 depicted in FIG. 2, child modules of the UDP module include a DNS module, an NFS module, and a DEFAULT module, and child modules of the TCP module include the NFS module, the DEFAULT module and a STREAM module. The details as the child module(s) to which the respective UDP or TCP module provides the packet stream, and so forth, are similar to those described above in connection with the ROOT and IP modules, and will not be described in detail. As shown in the illustrative analyzer module graph 35 depicted in FIG. 2, the STREAM module may also be a child of other modules. In one embodiment, the STREAM module is shown as being a child of an IPX module, an APPLETALK module and a CHAOSNET module, each of which performs corresponding operations in connection with information from streams of message packets provided thereto by a respective parent (not shown) in the analyzer module graph 35 to determine whether they conform to the IPX, APPLETALK or CHAOSNET protocol.

The DNS module processes the packet information provided thereto by the UDP and TCP modules to determine the likelihood that the packet information corresponds to the DNS ("domain name server") protocol. Devices make use of packets transferred using the DNS protocol in connection with communicating with a domain name server device to determine a network address associated with a particular domain name. If it is determined that the packet information is sufficiently likely to correspond to the DNS protocol, the DNS module can store information so indicating in the analyzed packet database 26. In addition, the DNS module can store information from the packet information, including, for example, the association between the network address and the domain name, in the analyzed packet database 26.

The NFS module processes the packet information provided thereto by the UDP and TCP modules to determine whether the packet information corresponds to the NFS protocol. The NFS protocol is used to allow a device, such as source device 11 or destination device 12, to access information in files that may be stored on other devices, in substantially the same manner that it uses to access information in files that are stored on the respective device 11, 12. If it is determined that the packet information corresponds to the NFS protocol, the NFS module can store information relating to the packet stream, which may include, for example, the identification of the web site and the files that are to be accessed, in the analyzed packet database 26.

Generally, the DNS module will be a child of only the UDP and TCP modules in the graph 35, and not also a child of other modules such as the IPX modules, because packet information corresponding to the DNS protocol will only be transferred over communication link 13 using message packets that conform to the UDP and TCP protocols, and not message packets that correspond to the IPX module. Similarly, the NFS module will be a child of only the UDP and TCP modules, and not of other modules, because packet information corresponding to the NFS protocol will only be transferred over communication link 13 using message packets that conform to the UDP or TCP protocol. Generally, it will be appreciated that the modules at the levels of the graph 35 above the DNS and NFS modules, in particular the IP, UDP and TCP modules, are associated with protocols that are used to transfer message packets over the communication link 13 between the communication source 11 and the communication destination 12. Accordingly, the information processed by the IP, UDP and TCP modules relate to information that would generally be included in the header portion(s) of the message packet(s) comprising the packet stream. On the other hand, the information processed by the DNS and NFS modules would generally be included in the payload portion(s) of the message packets comprising the packet stream.

The STREAM module is essentially the central point for handling all byte-stream oriented protocols. In that function, the STREAM module essentially couples packet information stream that it receive from its parent modules, namely the TCP module and perhaps other protocol recognition modules in the analyzer graph module 35 depicted in FIG. 2, to one or more child modules that can determine whether the packet information is in a respective one of plurality of byte-stream oriented protocols. Child modules of the STREAM module in the illustrative analyzer module graph 35 depicted in FIG. 2 include an IRC module, an HTTP module, an SMTP module, and NNTP module, a TELNET module, an FTP/CTRL module, an FTP/DATA module, an SSH module and an SSL module. These modules, along with the STREAM module, performs operations similar to those described above in connection with in connection with the IP, UDP and TCP module, in connection with a respective one of a plurality of byte-stream oriented protocols, to determine whether the packet information received thereby corresponds to the respective byte-stream oriented protocol. In particular, the IRC module determines the likelihood as to whether the packet information corresponds to the well-known IRC ("Internet relay chat") protocol, which is used in connection with real-time communication between operators operating respective ones of a plurality of devices such and devices 11 and 12, typically in textual form. If it is determined that the packet information corresponds to the IRC protocol, the IRC module can store an indication thereof in the analyzed packet database 26. In addition, the IRC module can store other information, such as the text comprising the communication in the respective packet information, in the analyzed packet database 26.

The HTTP module determines the likelihood as to whether the packet information corresponds to the HTTP ("HyperText Transfer Protocol") protocol, which is used in connection with the transfer of objects comprising Web pages in the HTML ("HyperText Markup Language") language. If it is determined that the packet information corresponds to the HTTP protocol, the HTTP module can store an indication thereof in the analyzed packet database. In addition, since a communication session involving a transfer of various objects comprising a Web page may involve a plurality of packet streams, each of which can be associated with packet information that will be separately processed and analyzed by the analyzer module graph, if the HTTP module determines that the packet information corresponds to the HTTP protocol, it will determine whether a "meet point" for the Web page has previously been established in the analyzed packet database 26. The HTTP module will establish a "meet point" to provide a point at which information identifying packet information associated with various objects comprising a multiple-object entity such as a Web page can be aggregated. If the HTTP module determines that no meet point exists in the analyzed packet database 26 for the Web page, it can establish a meet point for the Web page. After establishing the meet point, or if the HTTP module determines that a meet point for the Web page had already been established, the HTTP module can store information identifying the packet information in the meet point. Generally, all of the various objects associated with a Web page will be transferred using the HTTP protocol, and so the meet point associated with a web page can be used to identify the particular sets of packet information that are associated with the respective web page.

The SMTP module determines the likelihood as to whether the message packet information stream conforms to the SMTP ("Simple Mail Transfer Protocol") protocol, which is used in connection with transfer of electronic mail ("Email") . The NNTP module determines the likelihood as to whether the packet stream provided thereto conforms to the Network News Transfer Protocol (NNTP), which is used in connection with transfer of news information over the Internet. Generally, the SMTP protocol is used in connection with transfer of Email messages over the Internet, and the NNTP protocol is used in connection with transfer of network news messages over the Internet among members of so-called "news groups." Typically, when someone wishes to send an Email message to one or more recipients, he or she will provide an Email message including an Email address for each of the recipients; in that case, the Email message would be delivered to those recipients whose Email addresses are specified. The packet intercept and processing system 10 can intercept Email messages that are both transmitted and received by the respective device that is being wiretapped by the system 10. On the other hand, when someone wishes to send a network news message to a news group, he or she will provide an identifier for the news group, and the message will be distributed over the Internet associated with the identified news group. When someone wishes to review and possibly receive news messages associated with a news group, he or she can initially retrieve subject matter headers for the news messages that are associated with the respective news group, and selected therefrom news messages for retrieval. The packet intercept and processing system 10 can intercept network news messages that are both transmitted and received by the respective device is being wiretapped by the system 10, as well as the subject matter headers of the news messages associated with the news group(s) received by the respective device.

If it is determined that the packet information corresponds to the SMTP or NNTP protocol, the respective SMTP or NNTP module can store an indication thereof in the analyzed packet database 26. In addition, since, as with Web pages, Email message and network news messages can comprise a plurality of objects, including, for example, at least one text object, and perhaps one or more image and audio objects, the SMTP and NNTP modules can establish and make use of meet points in a manner similar to that described above in connection with the HTTP module.

The FTP/CTRL and FTP/DATA modules determines the likelihood that packet information provided thereto by the STREAM module corresponds to the control and data portions, respectively, of the FTP ("File Transfer Protocol") protocol. The FTP protocol is used to facilitate retrieval of files from a server, and includes a control portion and a data portion. The data portion comprises the data that is to be retrieved using the FTP protocol, under control of control information that is transferred using the control portion of the FTP protocol. The FTP/CTRL module determines the likelihood that packet information provided thereto by the STREAM module corresponds to the control portion of the FTP protocol, and the FTP/DATA module determines the likelihood that packet information provided thereto by the STREAM module corresponds to the data portion of the FTP protocol. If it is determined that the packet information corresponds to the control or data portion of the FTP protocol, the respective FTP/CTRL or FDTP/DATA module will store an indication thereof in the analyzed packet database 26. Since the FTP protocol induces a plurality of portions, each of which involves a respective packet stream, the FTP/CTRL and FTP/DATA modules establish and otherwise make use of meet points, similar to those described above in connection with the HTTP module, that the respective modules can make use of to provide a point at which information identifying packet information associated with various portions can be aggregated.

The TELNET module determines the likelihood that packet information provided thereto by the STREAM module corresponds to the well-known TELNET protocol. If it is determined that the packet information corresponds to the TELNET protocol, the TELNET module will store an indication thereof in the analyzed packet database 26.

The SSH module determines the likelihood that packet information provided thereto by the STREAM module corresponds to the well-known Secure SHell protocol. The SSL module determines the likelihood that packet information provided thereto by the STREAM module corresponds to the well-known Secure Socket Layer protocol. IF SSH or SSL module recognizes the packet stream provided thereto, it will store information so indicating in the analyzed packet database 26. In addition, packet streams transferred using the SSH and SSL protocols are encrypted, and the SSH and SSL modules can also attempt to decrypt them. Generally, during an interchange of message packets pursuant to the SSH protocol, the decryption keys will be provided, and the SSH module can use the decryption keys to decrypt the packet streams. After the SSH module has decrypted a packet stream, it will provide the decrypted packet stream to the STREAM module. The decryption key for use by the SSL module can be obtained by another methodology and provided to the SSL module. One illustrative methodology by which a decryption key can be obtained for use by the SSL module is described in the Garfinkel II patent application. After the SSL module has been provided with the appropriate decryption key, it will be able to decrypt the packet information provided thereto and provide the decrypted packet stream to the STREAM module.

In each case, the respective module can perform the respective operation by inspecting the byte stream comprising the message packet information stream provided thereto by the STREAM module to determine whether it contains certain artifacts that are unique to message packet information stream in the respective protocol.

In addition, if the respective module has one or more child modules, it can transfer the packet information thereto. As noted above, if it is determined that a packet stream corresponds to the SSH or SSL protocol, and if the respective SSH or SSL module successfully decrypts the packet stream, that module will provide the decrypted packet stream to the STREAM module as a child module. The STREAM module, in turn, can operate to distribute the decrypted packet stream to one or more of the others of its child modules for subsequent processing. For example, the SSL protocol may be used to transfer packet information that may be associated with a Web page, which, in turn, are transferred using the HTTP protocol within the SSL protocol. In that case, after the SSL module has decrypted a packet stream and provided the decrypted packet stream to the STREAM module, the packet stream may be directed to the HTTP module for processing, in which case it will typically be expected that the HTTP module will determine that the decrypted packet stream is likely to correspond to the HTTP protocol.

Figure 2:
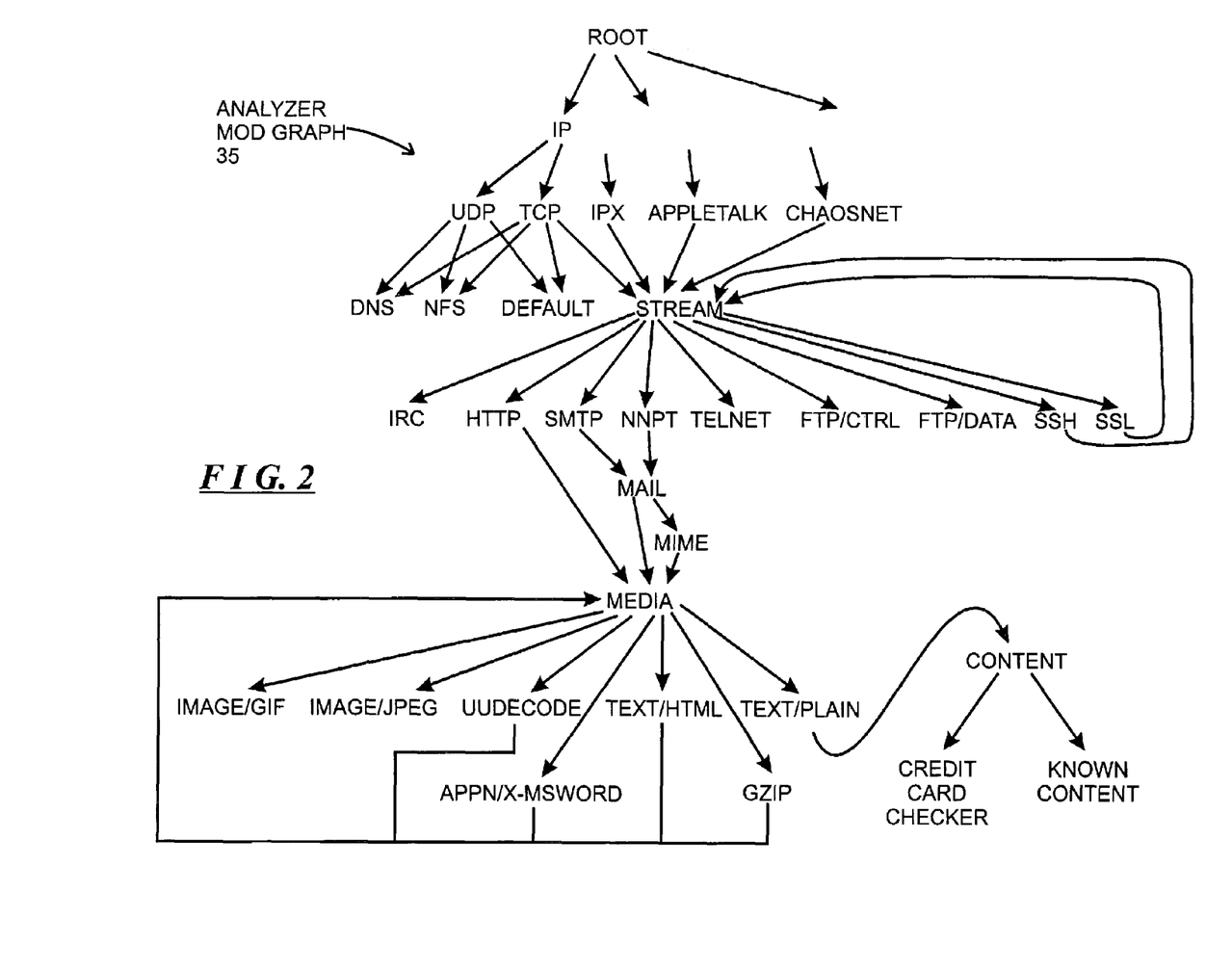
FIG. 2 schematically depicts an illustrative analyzer module graph useful in the packet interception and processing system depicted in FIG. 1.

The HTTP, SMTP, NNTP, TELNET and FTP/DATA modules in the illustrative analyzer module graph 35 depicted in FIG. 2 have child modules other than the STREAM module, and so each module will, if it is determined that the packet stream conforms to the respective protocol, strip off the respective protocol information and provide the remaining portion(s) to one or more of its respective child module(s). In the illustrative graph 35 depicted in FIG. 2, the HTTP module has one child module, namely, a MEDIA module, the SMTP and NNTP modules both have the same child module, namely, a MAIL module.

The MAIL module is a child of both the SMTP module and the NNTP module, since Email and network news messages have similar structures. For packet information received from the SMTP module, the MAIL module determines the likelihood that the packet information corresponds to the format defined by the SMTP protocol for an Email message. Similarly, for packet stream received from the NNTP module, the MAIL module determines the likelihood that the packet information corresponds to the format at defined by the NNTP protocol for a network news message. If it is determined that the packet information corresponds to the format defined by the SMTP protocol for an Email message, the MAIL module stores information so indicating in the analyzed packet database 26. Similarly, if it is determined that the packet information corresponds to the format defined by the NNTP protocol for a network news message, the MAIL module stores information so indicating in the analyzed packet database 26. In addition, the MAIL module will strip protocol information associated with the Email or network news message, which may include, for example, in the case of an Email message, names or other identifiers of the sender and recipient, in the case of a network news message, the sender and network news group, in either case, a subject description provided by the sender, and the like, and provide the rest of the packet information to one or more of its child modules.

In the illustrative analyzer module graph 35 depicted in FIG. 2, the MAIL module has two child modules, namely, the MEDIA module and a MIME module. The MAIL module can determine whether the information that it receives from the SMTP or NNTP module includes or comprises one or more object(s) that is/are encoded using one of the well-known MIME encoding methodologies. If the MAIL module determines that the object(s) is/are encoded using one of the MIME encoding methodologies, it will provide the MIME-encoded object(s) to the MIME module. On the other hand, if the MAIL module determines that the object(s) is/are not encoded using one of the MIME encoding methodologies, it will provide the object(s) to the MEDIA module.

If the MIME module receives information from the MAIL module, the MIME module will initially attempt to verify that the information provided thereto by the MAIL module is encoded using one of the well-known MIME encoding methodologies, If the MIME module does determine that the object(s) is/are encoded using one of the MIME encoding methodologies, it will also decode the information, store an indication therefor in the analyzed packet database 26, and provide the decoded information to the MEDIA module. In addition, the MIME module can store the a copy of the decoded information in the analyzed packet database 26.

The MEDIA module, which is a child module of the HTTP, MAIL and MIME modules, is essentially a central point for handling information that is associated with various types of media, which may comprise various types of text, image, and audio media, and other types of media as will be appreciated by those skilled in the art. The information that is provided by the HTTP, MAIL and MIME modules to the MEDIA module will comprise objects, without the protocol information for the message packets(s) that contained the object information. For each object that the MEDIA module receives from the respective HTTP, MAIL or MIME module, the MEDIA module transfer the object one or more of a plurality of child modules to enable them to analyze the respective object to determine the likelihood that the respective object corresponds to the respective type of media and store information relative thereto in the analyzed packet database 26.

In the illustrative analyzer module graph 35, child modules of the MEDIA module include an IMAGE/GIF module, an IMAGE/JPEG module, a TEXT/HTML, module, an APPLICATION/X-MSWORD module, a GZIP module, a UUDECODE module and a TEXT/PLAIN module. The IMAGE/GIF module, after receiving an object from the MEDIA module, determines the likelihood that the object is an object of the GIF media type, that is, that it is an image that is encoded using the well-known GIF (graphics interchange format) encoding methodology. In addition, the IMAGE/GIF module will store information as to its determination in the analyzed packet database 26. The IMAGE/JPEG module, after receiving message packet information stream, determines the likelihood that the object is an object of the JPEG media type, that is, that it is an image that is encoded using the well-known JPEG (joint photographic experts group) encoding methodology. In addition, the IMAGE/JPEG module will store information as to its determination in the analyzed packet database 26.

The TEXT/HTML module determines the likelihood that the object is an object of the HTML type, that is, that it is encoded in the well-known HTML (HyperText Markup Language), which, as noted above, is typically used to define the structure of and provide at least some of the text for Web pages, and stores information as to its determination in the analyzed packet database 26. In addition, if the TEXT/HTML module determines that the object is an object of the HTML type, it can extract text that is contained in the object in a selected form, such as ASCII, and also store the extracted text in the analyzed packet database 26. In addition, the TEXT/HTML module can provide the extracted text, as one or more objects, to the MEDIA module for further analysis as described above. Similarly, the APPLICATION/X-MSWORD module determines the likelihood that the object is an object of the MS Word type, that is, that it is a document in a format that is used by one of the various versions of the Microsoft Word word processor program, and stores information as to its determination in the analyzed packet database 26. In addition, if the APPLICATION/X-MSWORD module determines that the object is an object of the MS Word type, it can extract text that is contained in the object in a selected form, such as ASCII, and also store the extracted text in the analyzed packet database 26, and provide the extracted text to the MEDIA module as one or more objects. If the object of the MS Word type includes other types of information than text, such as graphical information, the APPLICATION/X-MSWORD module can also extract that information and store it in the analyzed packet database 26 and provide the information to the MEDIA module as one or more objects.

The GZIP module determines the likelihood that the object is compressed using the well-known Gnu "ZIP" compression methodology or a similar compression methodology. The UUDECODE module determines the likelihood that the object is encoded using the well-known UUENCODE encoding methodology. If the respective module determines that the object as provided by the MEDIA module is an object that has been compressed or encoded using the respective methodology, the respective module can store information so indicating in the analyzed packet database 26. In addition, the GZIP module can decompress the object and store the decompressed object in the analyzed packet database 26, and provide the decompressed object to the MEDIA module. Similarly, the UUDECODE module can decode the UUENCODEd object and store the decoded object in the analyzed packet database 26, and provide the decoded object to the MEDIA module.

Similarly, the TEXT/PLAIN module determines the likelihood that the object is an object of the ASCII type, that is, that it is a plain ASCII text object, and store information as to its determination in the analyzed packet database 26. In addition, if the TEXT/PLAIN module determines that the object is a plain ASCII text object, it will provide the object to a CONTENT module for processing as described below.

The MEDIA module can direct an object that it receives from the HTTP, MAIL or MIME module to one of its child modules described above based on packet meta information that it may receive from the respective HTTP, MAIL or MIME module, or based on packet meta information that it may itself generate after it receives the respective object. If the MEDIA module generates packet meta information, the packet meta information will reflect an initial assessment that the MEDIA module may make as to the object's media type or as to whether the object is compressed or UUENCODEd. At this point in the analyzer module graph 35, the packet meta information, if it is provided or generated, will generally provide information as to the object's media type, or whether it is compressed or UUENCODEd, as presumed by the source of the packet meta information. If the MEDIA module does not receive packet meta information for an object, and if it is unable to make an initial assessment as to the object's media type or whether the object is compressed or UUENCODEd, the MEDIA module can direct the object to one or more of the child modules described above to enable them to generate likelihood information indicating the likelihood that the object is of the respective object type, and make an assessment as to the likely object type based on the likelihood information generated by the respective child modules, and thereafter enable the child module that is associated with the assessed object type to perform its respective processing operations as described above.

In the illustrative analyzer module graph 35, the IMAGE/GIF module and IMAGE/JPEG module do not have children. However, the TEXT/HTML module, APPLICATION/X-MSWORD module, GZIP module, and the UUDECODE module all have the same child module, namely, the MEDIA module. The respective TEXT/HTML module, APPLICATION/X-MSWORD module, UUDECODE module and GZIP module that receives the object from the MEDIA module may provide the objects that they generate to the MEDIA module for further analysis. Since the object may be compressed and/or encoded several times, the decompressed or decoded object may still be compressed and/or encoded, and so the MEDIA module may provide the decompressed or decoded object that it receives from the GZIP or UUDE- CODE module, to the GZIP or UUDECODE module for further decompression or decoding. When the MEDIA module receives a fully decoded and/or decompressed object, it will provide the object to one of its other child modules for analysis as described above.

As noted above, the TEXT/PLAIN module has, as its child module, a CONTENT module. The CONTENT module is essentially a central point for facilitating certain types of processing operation in connection with the contents of the objects that are in ASCII text form that may be extracted by various ones of the children of the MEDIA module. In the illustrative analyzer module graph 35, the CONTENT module has two children, namely, a CREDIT CARD CHECKER module and a KNOWN CONTENT module. The CREDIT CARD CHECKER module performs a check to determine whether the message packet information stream is in a predetermined form that indicates that it may correspond to credit card information. The CREDIT CARD CHECKER module can determine whether the message packet information stream contains credit card information, by determining whether, for example, it contains a bit string that identifies, in ASCII form, one of a number of credit card providers, and that contains bit strings that, in ASCII form, comprises a number comprising a predetermined number of digits that may comprise an account number and a second number comprising a predetermined number of digits that may comprise an expiration date. If the CREDIT CARD CHECKER module determines that the message packet information stream provided thereto by the CONTENT module contains this information, it can recognize the information and store information associated therewith in the analyzed packet database 26. It will be appreciated that the credit card information as intercepted by the packet intercept and processing system 10 may be in encrypted form, transferred using the SSH or SSL protocols. In that case, the encrypted credit card information would be decrypted by the SSH module or the SSL module prior to being provided to the CREDIT CARD CHECKER module.

The KNOWN CONTENT module scans the ASCII text object provided thereto by the CONTENT module to determine whether it contains selected keywords or phrases. If the KNOWN CONTENT module determines that an object contains one or more of the selected keywords or phrases, it can store information therefor in the analyzed packet database 26.

Accordingly, it will be apparent that, for objects containing text information, but which may originally be in, for example, HTML format, the format used by the Microsoft Word word processing program, or other formats for which analyzer modules (not shown) may also be provided in the analyzer module graph 35, the object may sequence through various portions of the graph 35 several times.

(a) at least one time using, for example, the TEXT/HTML module, APPLICATION/X-MSWORD module, or other module as appropriate, to extract the ASCII text, and (b) at least one time using, for example, the TEXT/PLAIN module to verify that the text object extracted in (a) is in ASCII text form, after which the text object will be provided to the CONTENT module for provision to its children. In addition, prior to being provided to the TEXT/HTML module, the APPLICATION/X-MSWORD module, or other appropriate module, the object may be provided to the GZIP module and/or the UUDECODE module one or more times to facilitate decompression and/or decoding of the object.

The analyzer module graph 35 can ensure that the object does not loop endlessly among the various analyzer modules by ensuring that there is a transformation of the data stream comprising the object during processing by the respective analyzer module, and terminating if there is no such transformation. Thus, for example, as noted above if the TEXT/HTML or APPLICATION/X-MSWORD module determines that it is likely that an object provided thereto by the MEDIA module has the respective HTML or Microsoft Word format it will extract the text therefrom, which extracted text reflects a transformation from the object that the MEDIA module provided. to the respective module. In that case, the respective module will provide the extracted text, as an object, to the MEDIA module for further processing. On the other hand, if the TEXT/HTML or APPLICATION/X-MSWORD determines that it is unlikely that the object provided thereto by the MEDIA module is in the respective HTML. or Microsoft Word format, it will not extract the text therefrom. Accordingly, there will be no transformation, and the respective module will not provide an object to the MEDIA module.

Similarly, if the GZIP or UUDECODE module determines that it is likely that an object provided thereto by the MEDIA module is compressed or encoded it will perform a decompression or decoding operation, which results in a transformation from the object that the MEDIA module provided. to the respective module. In that case, the respective module will provide the decompressed or decoded object to the MEDIA module for further processing. On the other hand, if the GZIP or UUDECODE module determines that it is unlikely that the object provided thereto by the MEDIA module is compressed or encoded, it will not decompress or decode the object. Accordingly, there will be no transformation, and the respective module will not provide an object to the MEDIA module.

Accordingly, in the cases of the TEXT/HTM., APPLICATION/X-MSWORD, GZIP and UUDECODE modules, all of which would allow an object to loop through the portion of the analyzer module graph 35 headed by the MEDIA module, the object will loop as long as at least one of the TEXT/HTM., APPLICATION/X-MSWORD, GZIP or UUDECODE modules performs a transformation of the object. If none of the modules performs a transformation of the respective object, which will be the case if none of the modules determines that the object is in the respective form, there will be no transformation and the traversal of the object through at least that looping portion of the analyzer module graph 35 will terminate.

As noted above, the TEXT/PLAIN module determines the likelihood that the object provided thereto is plain ASCII text. In its processing, the TEXT/PLAIN module will not do a transformation of the object, but instead, if it determines that the object provided thereto is likely to be in plain ASCII text, it will provide the object to the CONTENT module for further processing by that modules children. If the TEXT/PLAIN module determines that it is not likely that the object is not likely to be in plain ASCII text, it will not provide the object to the CONTENT module; in that case, the traversal of the object through that portion of the analyzer module graph will terminate.

A number of other types of modules (none of which are shown) may also be provided for use in the illustrative analyzer module graph 35, including, but not limited to (i) a BINHEX module, which can be provided as a child of the MEDIA module to determine the likelihood that an object is encoded using the well-known Macintosh BINHEX encoding methodology; if it is determined that an object is encoded using the BINHEX encoding methodology the, the BINHEX module can store information therefor in the analyzed packet database 26, decode the object and provide the decoded object to the CONTENT module;

(ii) an RPC module, which can be provided as a child of the UDP and TCP modules to determine the likelihood that the packet information that it receives therefrom comprises a remote procedure call ("RPC"); if it is determined that the packet information comprises a remote procedure call, the RPC module can store information therefor in the analyzed packet database 26, which may include the identification of the procedure being called;

(iii) a TFTP module, which can be provided as a child of the UDP module to recognize message packet information stream in the Trivial File Transfer Protocol ("TFTP"); the TFTP module is also a parent of the MEDIA module and, if it is determines that the packet information is in the TFTP protocol, it can store information therefor in the analyzed packet database 26 and provide the file that was transferred to the MEDIA module as an object for further analysis;

(iv) an ETCPWD module, which can be provided as a child of the CONTENT module to determine the likelihood that an object provided thereto is an object in the Unix/etc/passwd (Unix password) format;

(v) a DHCP module, which can be provided as a child of the UDP module to determine the likelihood that the packet information provide thereto is in the dynamic host configuration protocol ("DHCP"), pursuant to which a device dynamically provides an Internet protocol ("IP") address, which is used in connection with transmission of message packets over a network such as the Internet, to a device, which is typically identified by a fixed identifier such as an Ethernet address; if it is determined that the packet information is in the DHCP protocol, the DHCP module can store information therefor in the analyzed packet database 26, which can include the associated between the IP address and the Ethernet address;

(vi) a FINGER module, which can be provided as a child of the TCP and STREAM modules to determine the likelihood that the packet information provided thereto comprises a FINGER request or a response to a FINGER request; if it is determined that the packet information comprises a FINGER request or a response to a FINGER request, the FINGER module can store information so indicating in the analyzed packet database 26; if it is determined that the packet information comprises a response to a FINGER request, the FINGER module can also provide packet information to a PLAN module as a child module thereof;

(vii) a PLAN module, which can be provided as a child of the FINGER module to determine the likelihood that the packet information provided thereto comprises a plan or calendar (a response to a FINGER request can include a plan or calendar for the person who was identified in the FINGER request); if it is determined that the packet information comprises a plan or calendar, the PLAN module can store information so indicating in the analyzed packet database 26, along with the plan or calendar;

(viii) an NTP module, which can be provided as a child of the UDP module to determine the likelihood that packet information provided thereto in the Network Time Protocol, which is used to distribute current time information over a network such as the Internet; if it is determined that the packet information is in NTP protocol, the NTP will store information so indicating in the analyzed packet database 26, which information may include a current network time value;

(ix) a PDF module, which can be provided as a child of the MEDIA module and perhaps also the CONTENT module to determine the likelihood that the object provided thereto is in the Adobe Acrobat format; if it is determined that the object is in the PDF format, the PDF module will store information so indicating in the analyzed packet database 26; in addition, the CONTENT module can convert the object to, for information in textual form, a selected text format, and for information in image form, a selected image format, both for storage in the analyzed packet database 26, and, if the PDF module is a child of the CONTENT module, it can provide the converted information to the CONTENT module; the converted message packet information stream can be analyzed by other modules that are children of the CONTENT module for processing as described above;

(x) a TIME module, which can be provided as a child of the UDP and TCP modules to determine the likelihood that packet information provided thereto is in the well-known RFC 868 time protocol format; if it is determined that the packet information is in the RFC 868 format, the TIME module will store information so indicating in the analyzed packet database 26, including time information from the packet information; and (xi) an UNKNOWN module, which can be provided as a child of the UDP and STREAM modules, and which generates an indication it is determined that the packet information is not likely to conform to any of the protocols handled by the UDP or STREAM module's children for storage in the analyzed packet database 26.

Modules for recognizing other types of packet information, which may form part of the analyzer module graph 35, may also be provided, as will be apparent to those skilled in the art.

The analyzer control module 36, in addition to controlling operations of the various modules comprising the analyzer module graph 35, also loads and initializes the various modules when the packet interception and processing system 10 is started. When a module is initialized, as part of the module's initialization procedure, the respective module attempts to register itself with one or more other modules that may comprise its parent(s) or child(ren). The analyzer module graph 35 is provided with an module list 40 and a module relationship table 41. The module list 40 includes a plurality of entries, each of which is associated with and identifies a module that forms part of the analyzer module graph 35. The module relationship table 41 includes a plurality of entries, each entry associated with a connection linking a respective set of parent and child modules.

Each module that may be linked into and comprise part of the analyzer module graph 35 is identified by a module identifier, and also is aware of the module identifier(s) of the module(s) that may comprise its parent module(s) (if any) and the module identifier(s) of the module(s) that may comprise its child module(s). As part of a module's initialization procedure, the module initially loads its identifier into the module list 40, thereby indicating that it is available to be linked to by another module. In addition, the module searches the module list 40 to identify those modules, if any, that are identified therein for which it may be parent module or a child module. If the module determines that another module is identified in the module list 40 for which it is required to be a parent module, the module adds an entry to the module relationship table 41, and loads into the entry its identification as the parent module and the identification of the other module as its child module. Similarly, if the module determines that another module is identified in the module list 40 for which it is required to be a child module, the module adds an entry to the module relationship table 41, and loads into the entry its identification as the child module and the identification of the other module as its parent module. After the module performs these operations, it will have registered in the analyzer module graph 35.

Figure 3:
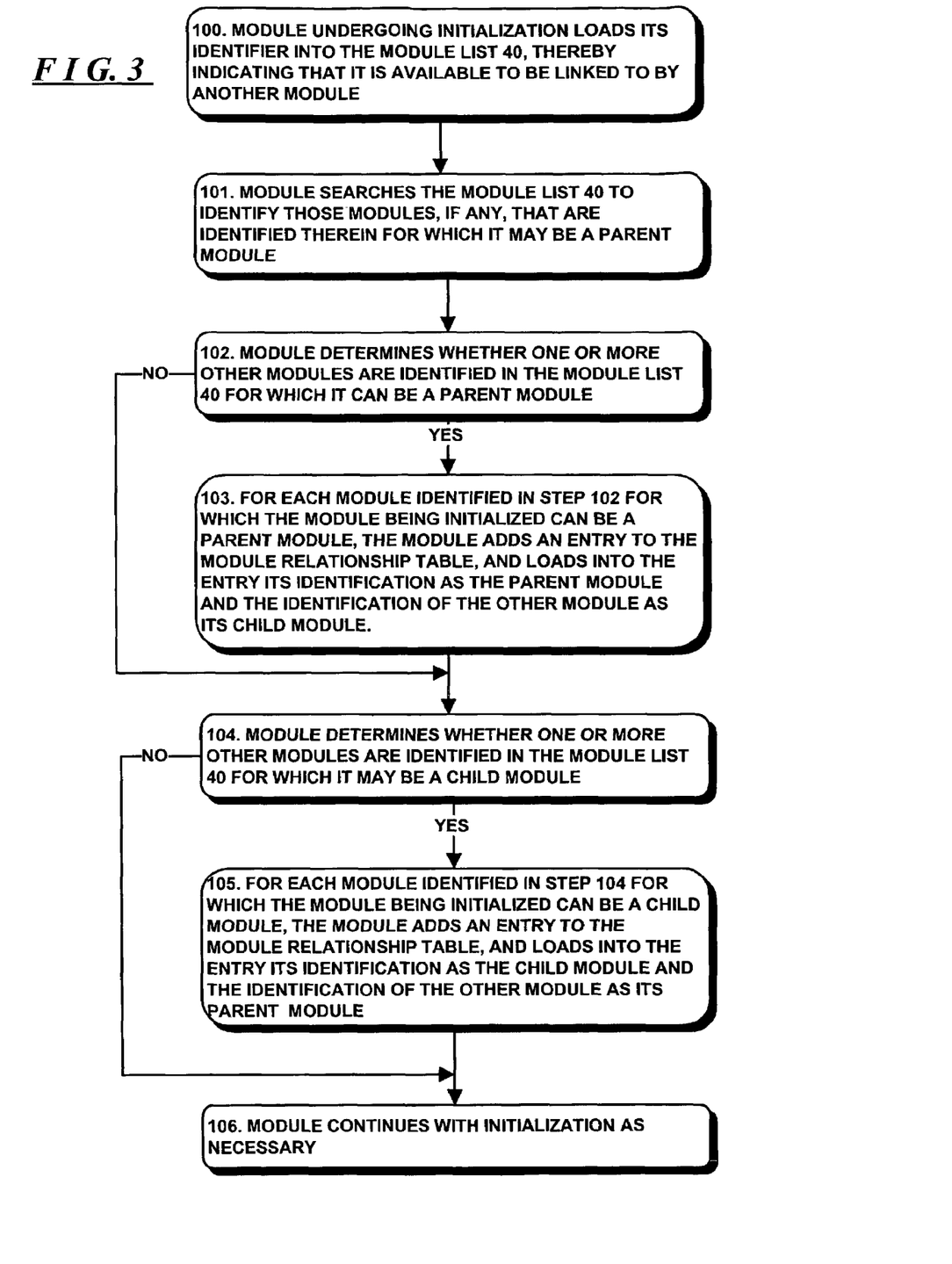
FIG. 3 is a flow chart depicting operations performed by modules comprising the illustrative analyzer module graph in connection with initializing and registering themselves with other modules in the graph.

A flow chart in FIG. 3 describe operations performed by a module in connection with initialization and registration. The operations described in the flow chart will be apparent to those skilled in the art from the above description, and will not be described further herein.

The invention provides a number of advantages. In particular, the invention provides an arrangement for efficiently recognizing and analyzing message packet information streams intercepted over a communication link, which may comprise, for example, a network link over which a device transmits and/or receives message packets received and/or transmitted by one or more other devices, and for generating reports that describe the information streams that were received and/or transmitted.

In addition, in the arrangement, recognition and analysis is performed by modules that are connected in an analyzer module graph. Each module comprising the analyzer module graph, when it is initialized, can register itself with other modules in the graph as parent and/or child, which can simplify construction of the analyzer module graph.

It will be appreciated that a number of changes and modification may be made to the packet intercept and processing system 10. For example, although the system has been described as providing authentication by cryptographically signing the message packets as they are intercepted, along with a time stamp associated with the time at which the packet interception and processing system 10 receive the message packet, and, perhaps, other identifying information, it will be appreciated that the system may make use of elements other than cryptographic signatures to facilitate authentication. Alternatively, the system may not provide authentication, in which case it may not provide any such elements.

In addition, although the system has been described as making use of methodology described in Garfinkel II patent application to obtain a descryption key for use by the SSL module, it will be appreciated that other methodologies may be used.

Furthermore, although the system has been described as making use of a report generator 27 that makes use of templates stored in a template store 30, it will be appreciated that other mechanisms may be provided to facilitate generation of reports.

In addition, although the system has been described as making use of analyzer modules of particular types, it will be appreciated that other types of analyzer modules may be provided. Generally, analyzer modules may be provided for ones of the various layers of protocols that may be used in connection with transfer of message packets and packet streams over the communication link 13, as well as for ones of the types of information that may comprise objects that are transported by the message packets and packet streams, such as audio objects, as well as for methodologies by which the various objects may be encoded, encrypted, compress, and so forth.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come with the true spirit and scope of the invention.

What is claimed as new and desired to be secured by Letters Patent of the United States is:

1. A system for analyzing and automatically recognizing content of packet streams intercepted over a communication link, the system comprising:
    an interface configured to receive packets over the communication link and assemble the received packets into one or more packet streams;
    a packet stream analyzer configured to receive respective packet steams from said interface and analyze each packet stream to generate selected types of information regarding the packet stream, the packet stream analyzer comprising an analyzer module graph comprising a plurality of analyzer modules interconnected in a graph, respective ones of the analyzer modules being configured to perform at least one analysis operation in connection with at least a portion of a packet stream provided thereto to determine the likelihood that the packet stream is of one of a plurality of predetermined types, and generate at least one selected type of information in relation thereto to an output.

2. A system as defined in claim 1 in which the respective analyzer modules are configured to store the information that they generate in a database module.

3. A system as defined in claim 2 further comprising a report generator configured to generate a report based on at least some of the information stored in the database module.

4. A system as defined in claim 3 further comprising a template store configured to store at least one report template, the report generator further being configured to use the at least one report template in generating the report.

5. A system as defined in claim 1 in which each packet stream comprises one or more message packets, the interface comprising:
    a link interface configured to intercept respective message packets from the communication link; and
    a packet demultiplexer configured to assemble the respective message packets into a packet stream.

6. A system as defined in claim 5 in which the interface further comprises a packet processor configured to perform at least one processing operation in connection with respective message packets that it receives.

7. A system as defined in claim 6 in which said at least one processing operation includes associating each received message packet with a time stamp to identify the time at which the message packet is received.

8. A system as defined in claim 6 in which the at least one processing operation includes associating each received message packet with a tag that facilitates authenticating contents of the respective received message packet.

9. A system as defined in claim 1, at least some of the respective packets streams including protocol information and an object, the analyzer module graph including at least one analyzer module configured to perform at least one processing operation in connection with the protocol information and at least one analyzer module configured to perform at least one processing operation in connection with the object.

10. A system as defined in claim 9 in which the protocol information in respective ones of said packet streams is associated with one of a plurality of types of protocols, said at least one analyzer module that is configured to perform said at least one processing operation in connection with the protocol information being configured to perform said at least one processing operation in connection with protocol information associated with one of said plurality of types of protocols.

11. A system as defined in claim 10 in which said analyzer module graph includes a plurality of analyzer modules that are configured to perform said at least one processing operation in connection with the protocol information, each such analyzer module being configured to perform said at least one processing operation in connection with protocol information of a particular type.

12. A system as defined in claim 10 in which at least one type of protocol defines a plurality of protocol layers, each protocol layer being associated with protocol information of a particular layer type, the analyzer module graph including a plurality of analyzer modules connected in series, each such analyzer module being configured to perform said at least one processing operation in connection with protocol information of a particular layer type.

13. A system as defined in claim 9 in which the object in a respective one of said packet streams is associated with one of a plurality of object types, said at least one analyzer module that is configured to perform said at least one processing operation in connection with the object being configured to perform said at least one processing operation in connection with an object associated with one of said plurality of object types.

14. A system as defined in claim 13 in which said analyzer module graph includes a plurality of analyzer modules that are configured to perform said at least one processing output in connection with the objects, each such analyzer module being configured to perform said at least one processing operation in connection with objects of a particular type.

15. A system as defined in claim 13 in which said analyzer module graph includes a plurality of analyzer modules, including the at least one analyzer module that is configured to perform said at least one processing operation in connection with an object associated with one of said plurality of object types, and further includes an analyzer module configured to perform a decoding operation in connection with the object, thereby to generate a decoded object, the decoded object being provided to the at least one analyzer module that is configured to perform said at least one processing operation in connection with an object associated with one of said plurality of object types, thereby to enable the at least one analyzer module that is configured to perform said at least one processing operation in connection with an object associated with one of said plurality of object types to perform said at least one processing operation in connection with a decoded object.

16. A system as defined in claim 13 in which said analyzer module graph includes a plurality of analyzer modules, including the at least one analyzer module that is configured to perform said at least one processing operation in connection with an object associated with one of said plurality of object types, and further includes an analyzer module configured to perform a decompression operation in connection with the object, thereby to generate a decompressed object, the decompressed object being provided to the at least one analyzer module that is configured to perform said at least one processing operation in connection with an object associated with one of said plurality of object types, thereby to enable the at least one analyzer module that is configured to perform said at least one processing operation in connection with an object associated with one of said plurality of object types to perform said at least one processing operation in connection with a decompressed object.

17. A system as defined in claim 9 in which:

the protocol information in respective ones of said packet streams is associated with one of a plurality of types of protocols, said analyzer module graph including a plurality of analyzer modules that are configured to perform said at least one processing operation in connection with the protocol information, each such analyzer module being configured to perform said at least one processing operation in connection with protocol information of a particular type; and the object in a respective one of said packet streams is associated with one of a plurality of object types, said analyzer module graph including a plurality of analyzer modules that are configured to perform said at least one processing output in connection with the objects, each such analyzer module being configured to perform said at least one processing operation in connection with objects of a particular type;

the analyzer module graph further including an analyzer module configured to operate as a central point for objects of respective object types, such analyzer module being configured to receive objects from analyzer modules that are configured to performs said at least one processing operation in connection with the protocol information and provide the object to one or more of the analyzer modules that are configured to perform said at least one processing operation in connection with the object.

18. A system as defined in claim 17 in which the analyzer module that is configured to operate as the central point for objects of respective object types is configured to utilize object type information associated with at least one object in connection with determining the one or more of the analyzer modules that are configured to perform said at least one processing operation in connection with the object to which it will provide the at least one object.

19. A system as defined in claim 17 in which, after one of the analyzer modules that is configured to perform at least one processing operation in connection with an object receives an object from the analyzer module that is configured to operate as a central point for objects of respective types, the one of the analyzer modules that is configured to perform at least one processing operation in connection with an object is configured to determine the likelihood that the object is of the associated type and condition performance of the processing operation on the likelihood determination.

20. A system as defined in claim 19 in which, after at least one of the analyzer modules that is configured to perform at least one processing operation in connection with an object performs a processing operation that results in a transformation of the object into a transformed object, that processor module provides the transformed object to the analyzer module that is configured to operate as a central point for objects of respective types.

21. A system as defined in claim 1 in which at least one packet stream is associated with a communication session, at least one analyzer module being configured to, while performing the at least one processing operation in connection with the at least one packet stream, determine whether a meet point has been established for the communication session and, if not, establish the meet point and associate the at least one packet stream with the meet point.

22. A system as defined in claim 21 in which the at least one analyzer module is further configured to, if, while performing the at least one processing operation in connection with the at least one packet stream, it determines that a meet point has been established for the communication session, it will associate the at least one packet stream with that meet point.

* * * * *